United States Patent
Talbert (10) Patent No.: US 6,910,294 B1
(45) Date of Patent: Jun. 28, 2005

(54) INTRA-FISHING LURE ANIMATOR APPARATUS

(76) Inventor: Rick W. Talbert, 102 Hillwood Dr., Dickson, TN (US) 37055

( * ) Notice: Subject to any disclaimer, the term of this patent is extended or adjusted under 35 U.S.C. 154(b) by 0 days.

(21) Appl. No.: 10/172,361

(22) Filed: Jun. 14, 2002

Related U.S. Application Data
(60) Provisional application No. 60/298,455, filed on Jun. 15, 2001.

(51) Int. Cl.$^7$ ................... A01K 85/00; A01K 85/01; H02K 33/00
(52) U.S. Cl. .................. 43/26.1; 310/40 MM; 310/81; 43/26.2; 43/42.31
(58) Field of Search ............... 310/112, 40 R, 310/81, 67 R, 40 MM; 43/42.06, 26.1, 17.1, 42.31, 17.5–17.6, 4

(56) References Cited

U.S. PATENT DOCUMENTS

| | | | | |
|---|---|---|---|---|
| 2,559,475 A | * | 7/1951 | Sparkman | 43/26.2 |
| 2,757,475 A | | 8/1956 | Pankova | 43/17.1 |
| 3,310,902 A | | 3/1967 | Godby | 43/17.1 |
| 3,841,012 A | * | 10/1974 | Maled | 43/26.2 |
| 4,223,467 A | | 9/1980 | Hodges, Jr. et al. | 43/42.3 |
| 4,380,132 A | | 4/1983 | Atkinson | 43/26.2 |
| 4,536,985 A | * | 8/1985 | Caviness | 43/17.6 |
| 4,583,313 A | | 4/1986 | Dugan, Jr. | 43/17.1 |
| 4,805,339 A | | 2/1989 | Fuentes et al. | 43/42.3 |
| 4,960,437 A | | 10/1990 | Watson et al. | 43/42.3 |
| 5,105,573 A | * | 4/1992 | Mays | 43/17.1 |
| 5,237,771 A | | 8/1993 | Watson et al. | 43/42.3 |
| 5,485,697 A | | 1/1996 | Watson et al. | 43/42.3 |
| 6,047,492 A | | 4/2000 | Watson et al. | 43/42.3 |
| 6,050,022 A | | 4/2000 | Brick | 43/26.2 |
| 6,108,962 A | | 8/2000 | Barron | 43/42.3 |
| 6,192,617 B1 | | 2/2001 | Lyles | 43/42 |
| 2002/0014031 A1 | | 2/2002 | Brinkman | 43/42.3 |
| 2002/0073800 A1 | | 6/2002 | West | 43/17.1 |
| 2002/0104250 A1 | | 8/2002 | West | |

FOREIGN PATENT DOCUMENTS

| | | | | | |
|---|---|---|---|---|---|
| DE | 3921156 | * | 1/1991 | | A01K/85/00 |
| DE | 19512031 | * | 2/1996 | | A01K/85/01 |
| GB | 2333431 | * | 7/1999 | | A01K/85/01 |
| JP | 2 255032 | * | 10/1990 | | A01K/85/00 |
| JP | 10-33089 | * | 2/1996 | | A01K/85/01 |
| JP | 9 205939 | * | 12/1997 | | A01K/85/00 |
| JP | 2000-125703 | * | 5/2000 | | A01K/85/00 |
| JP | 2001-17048 | * | 1/2004 | | A01K/97/00 |
| WO | 95-03691 | * | 2/1995 | | A01K/85/01 |
| WO | 9921416 | * | 5/1999 | | A01K/85/01 |

* cited by examiner

*Primary Examiner*—Burton Mullins
(74) *Attorney, Agent, or Firm*—Waddey & Patterson; Lucian Wayne Beavers (57) ABSTRACT

In a first embodiment of the invention, an intra-fishing lure animator, comprising: a vibrator; an electrical power source electrically connected to the vibrator for providing electric power to the vibrator; and a programmable controller electrically connected between the vibrator and the electrical power source to animate the fishing lure by actuating the vibrator. In a second embodiment of the invention, a fishing lure, comprising: a lure body having a cavity defined therein; a fishing hook attached to the lure body; an eyelet attached to the lure body for connecting the lure body to a fishing line; a first microcontroller housed in the cavity, the first microcontroller operative to electronically animate the lure body from side to side in the water; an energy source electrically connected to the first microcontroller to operate the first microcontroller; and a switch connected between the energy source and the first microcontroller. Further embodiments are also disclosed.

12 Claims, 6 Drawing Sheets

INTRA-FISHING LURE ANIMATOR APPARATUS

This application claims benefit of provisional U.S. Patent Application Ser. No. 60/298,455, filed Jun. 15, 2001, under 37 C.F.R. § 1.53(c), entitled "Microlure: Programmable Electronic Vibrating Device for Fishing Lures & Other Devices."

Be it known that I, Rick W. Talbert, a citizen of the United States, residing at 102 Hillwood Drive, Dickson, Tenn. 37055; have invented a new and useful "Intra-Fishing Lure Animator Apparatus."

A portion of the disclosure of this patent document contains material that may be subject to copyright protection. The copyright owner has no objection to the facsimile reproduction by anyone of the patent disclosure, as it appears in the U.S. Patent and Trademark Office patent file or records, but otherwise reserves all copyright rights whatsoever.

BACKGROUND OF THE INVENTION

Fishing lures have been used for both commercial and recreational fishing for many decades, if not hundreds of years. As an alternative to catching live bait for use in fishing, and the occasional onerous task of keeping live bait alive while fishing, many fishermen have found it beneficial to use fishing lures as artificial bait to catch fish. Historically, the use of artificial lures in fishing required fishermen to learn and employ techniques to make the artificial lures behave as live bait would behave when moving through the water, since it has been demonstrated that greater fishing success can be had in so doing.

It will be appreciated that attempting to impart realistic movements to artificial lures is a somewhat physically demanding task, requiring specialized knowledge in the movements of live bait as well as a physical ability to use such knowledge in making the artificial lure appear to be alive, thus increasing the enticement and resulting harvest of fish. Not only do these demands make fishing more arduous, the movements of the fishermen that are required to impart such lifelike behavior to an artificial lure often place physical strains on the fisherman's arms and hands as the fisherman attempts to animate an artificial lure using such techniques. In fact, many fishermen can attribute muscular and nerve ailments to the physical stresses associated with animating artificial lures.

To remedy some of the difficulties associated with animating artificial lures, fishing lures have been developed to act on their own to ease the task of animating the lures during fishing. For example, lures have been developed to emit fish-attracting scents. Other lures have been developed with rattles inside to attract fish through sound. Still other lures have been made to vibrate after being wound up with a winding device to visually attract fish through lifelike movement. However, no lure has been developed to imitate lifelike bait movement through electrically- or electronically-driven animation.

What is needed, then, is an electrically-powered fishing lure animator to mimic live bait movements while the lure is in the water.

SUMMARY OF THE INVENTION

The present invention generally relates to an intra-fishing lure animator that is electrically powered. More specifically, the present invention relates to the animating of a fishing lure by an electrically powered and programmably controlled vibrator within the fishing lure body.

The intra-fishing lure animator of the invention incorporates a vibrating device that is both electrically powered and programmably controlled via a programmable control system that dictates the operation of the vibrator. The vibrator, the programmable controller, and the electrical power source are arranged in an electrical circuit. The circuit is naturally broken, and the majority of the circuit is housed within a fishing lure to be animated. The broken portion of the circuit is exposed through the exterior of the lure so that placing the fishing lure underwater enables the circuit to be closed by the water itself. When the circuit is closed, the vibrator is actuated by the electrical power source and the action of the vibrator are controlled by the programmable controller. The programmable controller may be programmed in any of a number of ways to direct that the vibrator be actuated in any desirable manner, even in a random manner.

Accordingly, it is an object of the present invention to provide a fishing lure animator having improved lure-animating characteristics.

It is a further object of the invention to provide a fishing lure animator that is electrically powered from within to mimic the action of live bait.

It is a further object of the invention to provide a fishing lure that electronically attracts fish by imitating the actions of live bait.

It is further object of the invention to provide a modular fishing lure system that allows for a fishing lure to be fitted with any of a variety of intra-fishing lure animators, each of which causes the fishing lure to behave in a different manner when in place.

It is a further object of the invention to ease the physical task of animating artificial lures to imitate live bait.

It is a further object of the invention to ease the mental task of continually animating an artificial lure in a manual fashion.

In addition to the foregoing, further objects, features, and advantages of the present invention should become more readily apparent to those skilled in the art upon a reading of the following detailed description in conjunction with the drawings, wherein there are shown and described illustrated embodiments of the invention.

DESCRIPTION OF THE PREFERRED EMBODIMENTS

Figure 1:
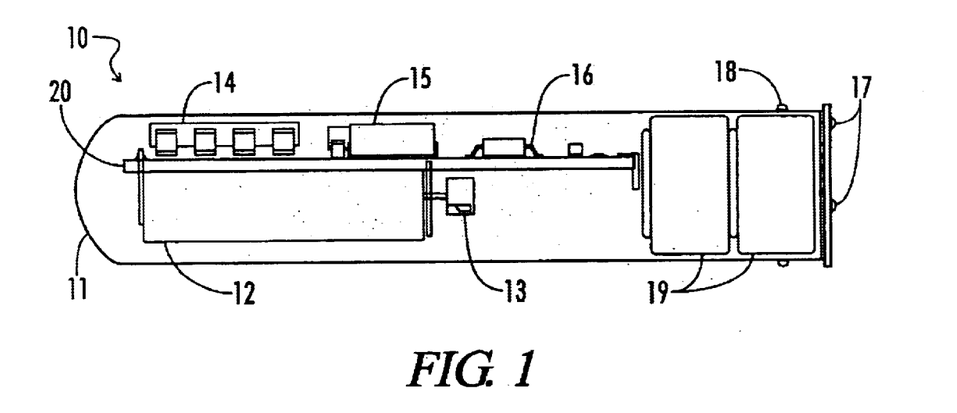
FIG. 1 is a plan view of a first embodiment of the intra-lure animator of the invention.

Referring to FIG. 1, a first embodiment of the intra-fishing lure animator of the invention is shown, with a vibrator 10 that is designed in a bullet capsule configuration for insertion into a fishing lure as will be seen below. Bullet capsule 11 houses at least one micromotor 12 having a weighted armature 13 extending therefrom to impart vibratory motion to a fishing lure. Micromotor 12 is mounted on a circuit board 20, which supports the hardware that will control the actions of micromotor 12. The micromotor is DC voltage polarized, and is of a type similar to a Vibramotor Model OTL-4TH3 DC coreless motor with an operating voltage range of 1.1 to 4 VDC, of a type such as are manufactured by K'otl/Jinlong Machinery & Electronics Co., Ltd. of Wenzhou Zhejiang, China. A process controller 14 contains resident firmware or software that instructs motor control circuit 15 to activate micromotor 12, which in turn rotates weighted armature 13 to impart vibration to the fishing lure. Weighted armature 13 is similar to model OTL4-4 or model OTL-6 coreless DC motor that can be purchased from the same company as that listed above. A power supply regulation and water contact sensor circuit 16 is also mounted to circuit board 20 to control the power that is supplied to the rest of the circuitry and the micromotor mounted to circuit board 20. Specifically, power supply regulation and water contact sensor circuit 16 is operative to sense that water has closed the circuit at water activation contacts 17, thus allowing power from batteries 19 to cause process controller 14 to send instructions to motor control circuit 15, which in turn controls the operation of micromotor 12. A water seal and retention ring 18 is placed around the end of bullet capsule 11 that is closest to water activation contacts 17 to provide both a seal against the ingress of water to the cavity in which bullet capsule 11 is to be inserted, as well as a retention ring for preventing bullet capsule 11 from inadvertently sliding out of the cavity.

Figure 2:
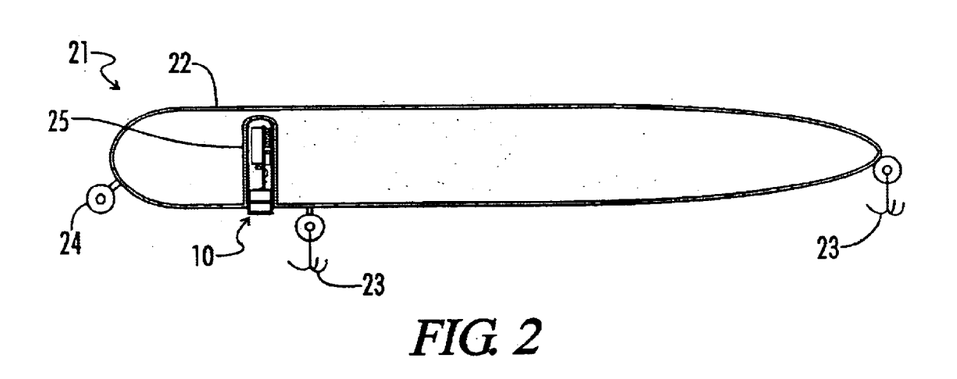
FIG. 2 is a plan view of a generic lipless lure with the intra-lure animator of FIG. 1 inserted into a cavity therein.

Referring to FIG. 2, a generic lipless lure 21 is shown, having a lure body 22, at least one hook 23, and a line tie eyelet 24 as are well known in the art. A cavity 25 is formed in lure body 22 sufficient to slidably receive and retain bullet capsule 11. Having received bullet capsule 11, lure 21 is animated as follows. Process controller 14 contains firmware and/or software resident therein that cause micromotor 12 and weighted armature 13 to operate, imparting rotational torque to vibrator 10 and causing vibrations to translate to lure body 22 and the surrounding water. The preferred method of making a process controller is to use a processor with on-board memory storage such as EPROM. Using a low-voltage controller such as process controller 15 would be desirable to extend the battery life of batteries 19. Process controller 14 may be operated at any of a variety of frequencies, rpm vibration routines, or cadences to cause lure 21 to behave in any of a variety of ways to imitate various types of live bait. Lure body 22 could be made of soft plastic, hard materials, or any other conventional material. Bullet capsule 11 may be color-coded according to various specific characteristics of vibration that are imparted thereby, so that a fisherman desiring to use a particular vibrator may identify it by sight and select it for use in animating lure 21. This is desirable because different species of fish are attracted by different movements. In the preferred embodiment, circuit board 20 is less than twenty-four (24) millimeters long and no more than seven (7) millimeters in width or height. The end of bullet capsule 11 adjacent water activation contacts 17 also should have edges or an area that is able to be grasped to aid the removal of bullet capsule 11 from lure body 22.

In an alternative version of the second embodiment of the invention, the actuation of vibrator 10 may be enhanced by the addition of a temperature sensor connected to process controller 14 that will cause vibrations to operate at a faster rate in warmer temperatures according to the programming of process controller 14 and to operate more slowly at lower temperatures. This type of temperature sensitivity will enable lure 21 to assume a more lifelike motion, since it is well known that living animals under the water typically animate more slowly in colder temperatures than in warmer water temperatures.

Figure 3:
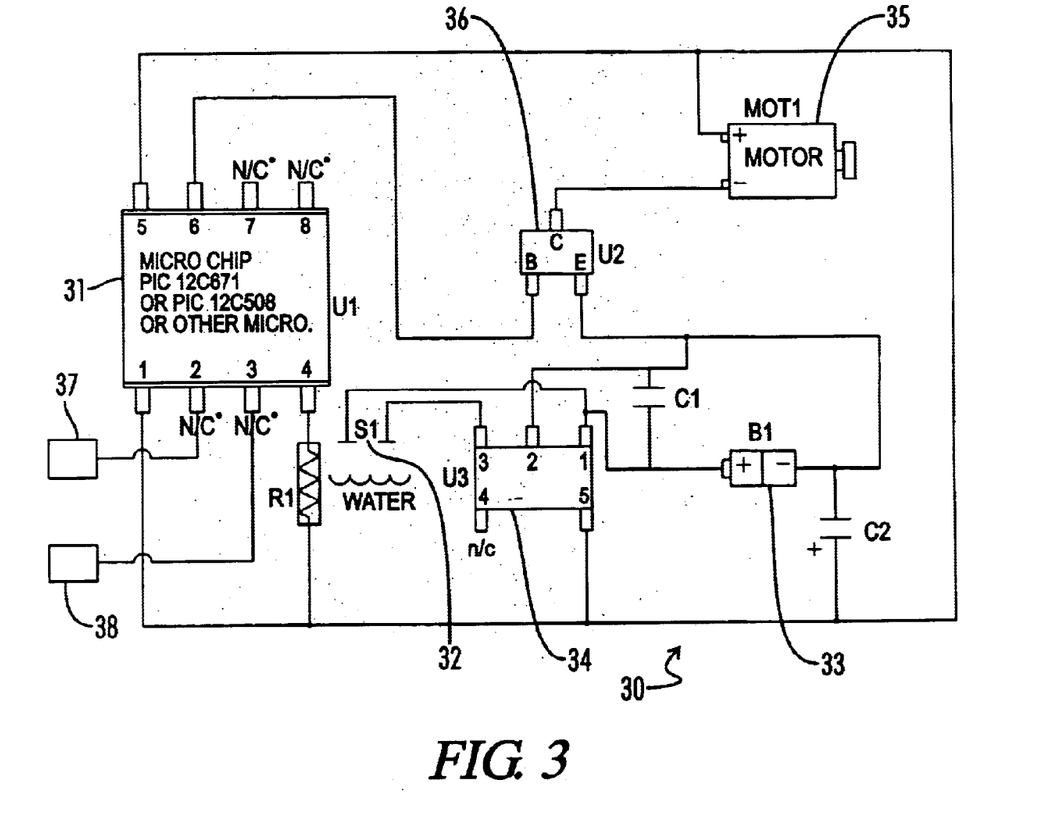
FIG. 3 is a schematic diagram of the intra-lure animator circuit of the invention.

Referring to FIG. 3, a preferred embodiment of a schematic diagram of the intra-lure animator 30 of the invention is shown, with a microchip 31 having resident logic thereon to animate a fishing lure in the manner herein described. Microchip 31 has a number of input/output pins that allow microchip 31 to interface with the other components of the animator. An activation switch 32 is closed by water, connecting the electrical source that is a battery 33 to a voltage regulator 34 and activating microchip 31. Microchip 31 and voltage regulator 34 then activate motor 35 via switching transistor 36 in the manner directed by the resident logic of microchip 31. Various auxiliary pins that are unused in the basic embodiment of the invention may be used to receive inputs from a temperature sensor 37, for example, to control the speed and duration of the vibration to mimic known live bait behavior in response to water temperature. Microchip 31 would contain routines to receive input from temperature sensor 37 and to control the vibration actions in response thereto. Also, a remote actuation mechanism may be connected to microchip 31 to provide the fisherman with the ability to remotely control the activity of the fishing lure. For example, a conventional mercury switch or ball vibration switch 38 may be attached to an auxiliary pin of microchip 31 and to ground to receive manual actuation or sleep commands from the fisherman controlling the lure. In one embodiment of the invention, the fisherman jerks the rod and reel to close mercury switch or ball vibration switch 38, which in turn signals microchip 31 to activate vibrations or, if vibrations are activated, to terminate vibrations. Many types of on/off commands may be issued to the lure animator by the mere introduction of mercury switch or ball vibration switch 38. Moreover, many types of remote actuation mechanisms may be employed to perform this function.

Figure 4:
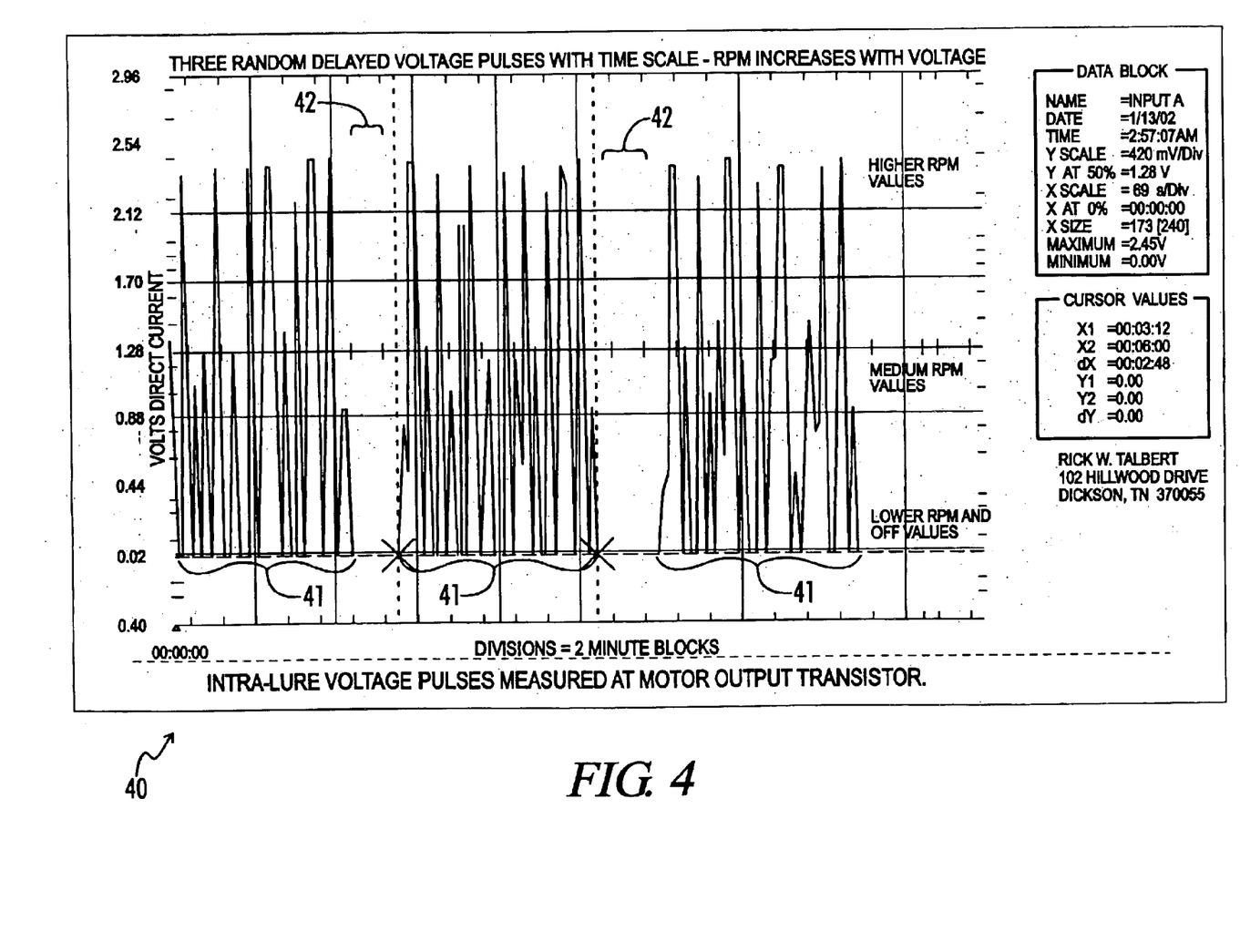
FIG. 4 is a graphical representation of the operation of the circuit of FIG. 3.

Referring to FIG. 4, a graphical representation 40 of the operation of the circuit of FIG. 3 is shown, as voltage is supplied to the circuit to cause the animator to vibrate. Specifically, three voltage pulses 41 are shown, each pulse 41 indicating that voltage is supplied to the animator in amplitudes up to 2.5 volts DC. Each pulse 41 is approximately five minutes in duration, and there are rest periods 42 of approximately two minutes between pulses 41. These pulses 41 and rest periods 42 are merely exemplary; many variations may be made to the system of the invention to cause the animator to vibrate in a desired manner.

Figure 5:
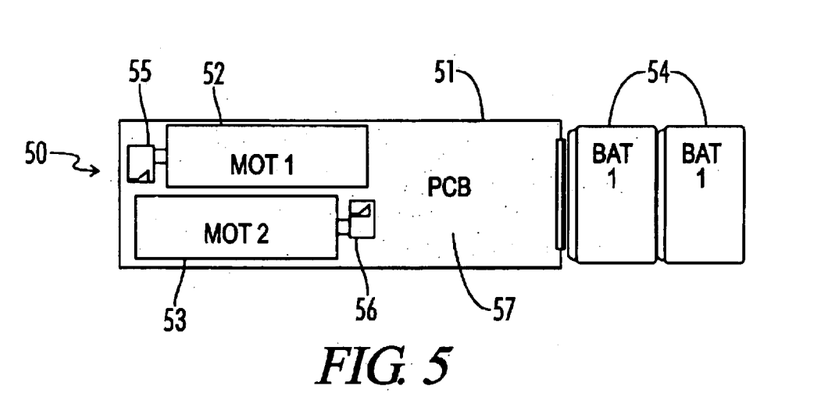
FIG. 5 is a plan view of a second embodiment of the intra-lure animator of the invention.

Referring to FIG. 5, a second embodiment of the intra-fishing lure animator is designed primarily for installation in a lipped lure, so that the animator imparts not only vibration to the lure but also a sort of steering, as will be seen below. The lipped lure's animation will be actuated by a vibrator 50, which in turn has a circuit board 51 with a first micromotor 52 and a second micromotor 53 mounted thereon. Each of first micromotor 52 and second micromotor 53 has a weighted armature 65 and 56, respectively, extending therefrom to impart vibratory motion to the fishing lure by turning in a conventional manner. An arrangement of circuitry referred to as a programmable controller 57 is also mounted on circuit board 51 and is arranged to control the operation of first micromotor 52 and second micromotor 53. Batteries 54 are in communication with circuit board 51 to provide power to both programmable controllers 57 and micromotors 52 and 53. Any of a number of batteries will suffice to operate the animator so long as the current provided to the apparatus renders the apparatus operative as described and claimed herein. Programmable controller 57 is logically arranged to actuate one or both of micromotors 52 and 53 to control the operation of the micromotors.

Figure 6:
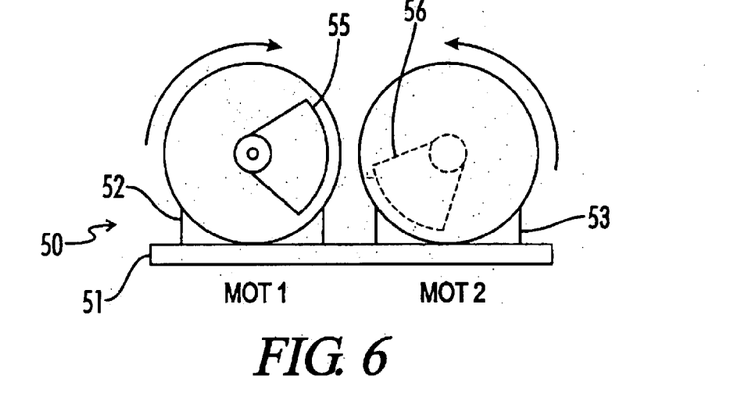
FIG. 6 is an end view of the intra-lure animator of FIG. 5 showing rotational motion of a portion of the animator.

Referring to FIG. 6, first weighted armature 55 and second weighted armature 56 are arranged in opposition to each other so that as either one or both of first micromotor 52 and second micromotor 53 are actuated by programmable controller 57, the rotation of first weighted armature 55 and second weighted armature 56 impart a torque that causes a slight pitch or roll from side to side as pulses of current are sent to the micromotors. The operation of each micromotor will cause each respective weighted armature to turn in a clockwise direction as observed from the shaft end of the motor as programmable controller 67 sends pulses of current to each of the micromotors through a transistor. The clockwise torque of each micromotor and weighted armature arrangement causes rotational motion that, in turn, causes the vibrator to vibrate through translated rotational torque. The steering-type function of this second embodiment of the invention is discussed below relating to FIGS. 8, 9, and 10.

Figure 7:
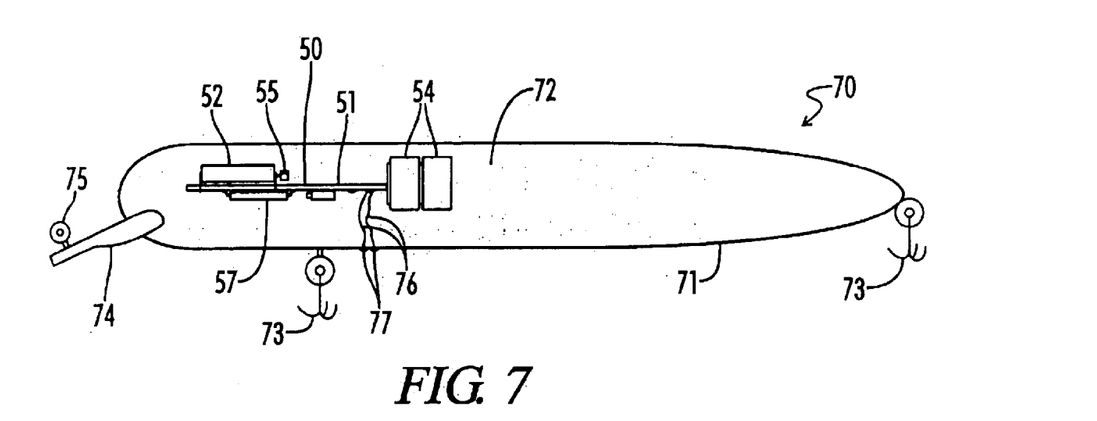
FIG. 7 is a side view of a generic lipped lure fitted with the intra-lure animator of FIG. 5.

Referring to FIG. 7, a generic fishing lure 70 is shown, with a lure body 71 having a cavity 72 therein sufficient to house vibrator 50 as constructed in the manner previously described. Lure 70 has one or more hooks 73 attached thereto, as well as a conventional lip 74, which supports a line tie eyelet 75 in a known manner. The construction of vibrator 50 is as described hereinabove relating to FIGS. 5 and 6, but in FIG. 7 it can be seen that a pair of electrical wires 76 depend downward from circuit board 51 to a pair of contacts 77 which are separated by a small distance from each other. Wires 76 and contacts 77 form a part of the circuit of vibrator 50 that will act as a switch, such that when lure 70 is cast into the water, the water itself closes this switch between contacts 77, thus activating the entire circuit as well as vibrator 50.

Figure 8:
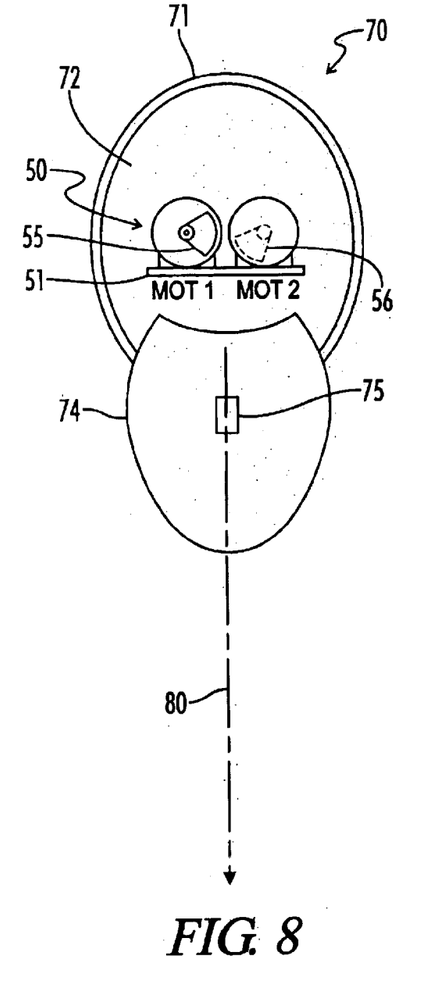
FIG. 8 is an end view of a generic lipped lure fitted with the intra-lure animator of FIG. 5 while the lure is not animated.

Referring to FIG. 8, lure 70 is shown with vibrator 50 installed in an unactuated state. Lure 70 is made in a conventional manner to employ lip 74 to cause lure 70 to dive to a certain depth and maintain such depth during retrieval of lure 70. Retrieval generally occurs along retrieval line 80, which points in the direction of the fisherman.

Figure 9:
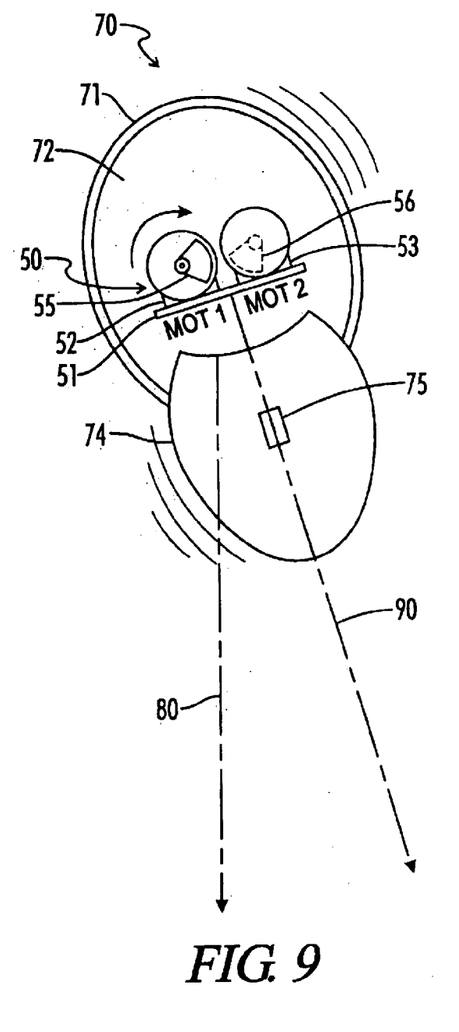
FIG. 9 shows the lure of FIG. 8 as the lure is animated by the intra-lure animator of FIG. 5 in a first direction.

Referring to FIG. 9, as lure 70 moves through the water, vibrator 50 is actuated in a manner described above relating to FIG. 7 so that first micromotor 52 begins to rotate first weighted armature 55, causing lure 70 to slightly roll in response to the translated torque imparted by first micromotor 52's operation. As lure 70 rolls, lip 74 pitches in that direction, directing a slight change in the direction of forward motion of lure 70 from a direction along retrieval line 80 and in a new direction along first altered retrieval line 90 as lure 70 is being retrieved. This alteration in line of retrieval is momentary; lure 70 will always tend to travel along retrieval line 80 unless vibrator 50 causes a different motion as described.

Figure 10:
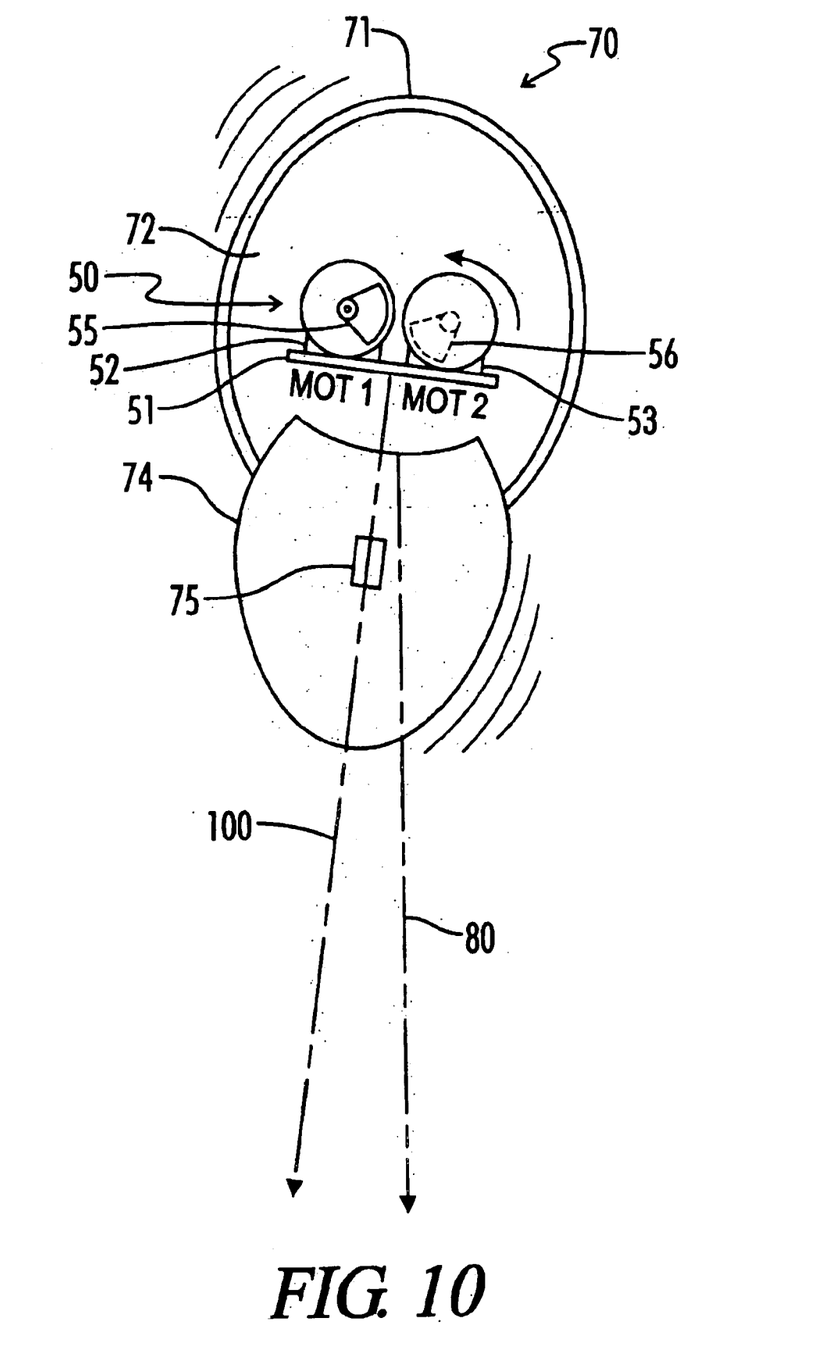
FIG. 10 shows the lure of FIG. 8 as the lure is animated by the intra-lure animator of FIG. 5 in a second direction.

Referring to FIG. 10, programmable controller 57 next sends a pulse of current to second micromotor 53, rotating second weighted armature 56 and causing vibrator 50 to impart to lure 70 a slight roll to the right. As lure 70 rolls, lip 74 pitches, directing a slight change in the direction of forward motion of lure 70 from a direction along retrieval line 80 and in a new direction along second altered retrieval line 100 as lure 70 is being retrieved. This alteration in line of retrieval is momentary; lure 70 will always tend to travel along retrieval line 80 unless vibrator 50 causes a different motion as described.

Further referring to FIG. 10, rolling and drifting to the left and the right effectively cause lure 70 to continually change direction as lure 70 is being retrieved, imparting further lifelike action to lure 70. The circuitry of programmable controller 57 directs first micromotor 52 and second micromotor 53 to operate in any of a number of ways to cause lure 70 to wag from side to side to imitate live bait. This is accomplished in the second embodiment of the invention by a software routine that starts automatically upon closing of the circuit by the water interacting with contacts 77 in which programmable controller 57 runs a software routine that sends current pulses to one or both motors intermittently, turning the respective weighted armatures to produce torques that cause lure 70 to roll slightly in response. Arranging the micromotors in opposite directions from each other allows lure 70 to wag from side to side, since the micromotors turn in opposite directions from each other. In addition to the wagging motion, this controlled operation of the micromotors delivers vibration energy throughout lure body 71 and into the surrounding water, and the vibrations are detected by and begin to attract fish. While the system of the invention may be employed in lures that do not incorporate lip 74, the system of the invention works best in lures that have a diving lip or blade such as lip 74. However, if vibrator 50 is installed in a lure that does not have lip 74, vibrator 50 may still animate the lure, but the movements of the lure will generally not be as great as a lure having lip 74. Moreover, it is generally not essential for vibrator 50 to have both of first micromotor 52 and second micromotor 53 in order to cause the animation herein described. A single micromotor may animate the lure sufficiently in some cases. In any event, the user of lure 70 would cast lure 70 into the water and begin a steady retrieval, with the water acting as a switch activating vibrator 50 to animate lure 70.

Numerous software routines may be programmed into the circuitry of the intra-lure animator of the invention to operate the animator. For example, software may direct the animator to actuate in pulses of shorter duration to save battery life or to attract different species of fish. A basic software routine that is used in a preferred embodiment of the invention has the following logic. When a lure equipped with the animator of the invention is cast into the water, the water-exposed contacts contact the water, closing the circuit. Closing of the circuit energizes and initializes the processor. The processor then controls the animator to cause the animator to go into a vibration mode for a certain duration. At the end of the animator's vibration mode, the lure puts itself into a sleep mode awaiting further actuation from the fisherman. If the animator is reeled back out of the water before the vibration mode runs for its duration, the circuit is broken and goes into a sleep mode until the lure is re-cast into the water, at which time the actuation and animation begins anew.

In an alternative version of the first embodiment of the invention, a remote actuation mechanism such as mercury or ball vibration switch, any other g-force-actuated switch, or any conventional remote control-type device is mounted on circuit board 51 to be triggered by a short, jerk-type motion. Wires 76 and contacts 77 work as a switch to be closed by water in the same manner as that described above. By electrically connecting the remote actuation mechanism to ground and to a circuit input in such a manner as that described above relating to FIG. 3, the remote actuation mechanism will activate microchip 31 to being a vibration routine. In this manner, vibrator 50 is totally enclosed within lure 70, and a twitching-type action of the fisherman would cause the remote actuation mechanism to activate vibrator 50, which will operate for a specific duration such as thirty seconds. Similarly, a second twitch can initiate a stop command to programmable controller 57, wherein the remote actuation mechanism causes the vibration routine to stop. During the times that vibrator 50 is not running, programmable controller 57 will go into a power-saving mode until the user twitches lure 70 again to activate the mercury or ball vibration switch. This alternative version of the first embodiment of the invention allow for the use of vibrator 50 with both lipped and lipless lures as well as lipped or bladed diving lures.

Thus, although there have been described particular embodiments of the present invention of a new and useful Intra-Fishing Lure Animator Apparatus, it is not intended that such references be construed as limitations upon the scope of this invention except as set forth in the following claims.

I claim:

1. An intra-fishing lure animator, comprising:
   a vibrator;
   an electrical power source electrically connected to the vibrator for providing electric power to the vibrator;
   a software programmable controller electrically connected between the vibrator and the electrical power source to animate the fishing lure by actuating the vibrator; and
   a remote actuation mechanism connected to the programmable controller for allowing the programmable controller to be remotely actuated by manipulation of the fishing lure.

2. The animator of claim 1, wherein the remote actuation mechanism is a mercury switch.

3. The animator of claim 1, wherein the remote actuation mechanism is a ball vibration switch.

4. An intra-fishing lure animator, comprising:
   a circuit board for supporting a programmable controller;
   a first micromotor having a first weighted armature extending therefrom, the first micromotor electrically connected to the circuit board, the first weighted armature of sufficient weight to cause the fishing lure to wag from side to side in the water when the first weighted armature is turned;
   a second micromotor having a second weighted armature extending therefrom, the second micromotor electrically connected to the circuit board, the second weighted armature of sufficient weight to cause the fishing lure to wag from side to side in the water when the second weighted armature is turned, the first and second weighted armatures being arranged to act as counterforces with respect to each other;
   a programmable controller supported by the circuit board to control the operation of the first micromotor and the second micromotor; and
   an electrical power source electrically connected to the first micromotor and to the second micromotor.

5. The animator of claim 4, further comprising a switch for activating the first micromotor and the second micromotor.

6. The animator of claim 5, wherein the switch is closed by water.

7. The intra-fishing lure animator of claim 4, wherein the programmable controller is operative to alternate in operating the first and second weighted armatures so as to impart intermittent opposing forces to the fishing lure.

8. The intra-fishing lure animator of claim 4, wherein the programmable controller is operative to cause the first micromotor and the second micromotor to operate to impart random movement to the fishing lure.

9. The intra-fishing lure animator of claim 4, wherein the electrical power source is a battery.

10. The intra-fishing lure animator of claim 4, further comprising a remote actuation mechanism connected to the programmable controller for allowing the programmable controller to be remotely actuated.

11. The intra-fishing lure animator of claim 10, wherein the remote actuation mechanism is a mercury switch.

12. The intra-fishing lure animator of claim 10, wherein the remote actuation mechanism is a ball vibration switch.

* * * * *